(12) United States Patent
Power (10) Patent No.: US 11,155,408 B2
(45) Date of Patent: Oct. 26, 2021

(54) FOOD STORAGE SYSTEM

(71) Applicant: POWER FOOD TECHNOLOGY LIMITED, County Kildare (IE)

(72) Inventor: John Power, County Kildare (IE)

(73) Assignee: POWER FOOD TECHNOLOGY LIMITED, County Kildare (IE)

( * ) Notice: Subject to any disclaimer, the term of this patent is extended or adjusted under 35 U.S.C. 154(b) by 82 days.

(21) Appl. No.: 16/632,666

(22) PCT Filed: May 29, 2018

(86) PCT No.: PCT/EP2018/064107
§ 371 (c)(1),
(2) Date: Jan. 21, 2020

(87) PCT Pub. No.: WO2019/020249
PCT Pub. Date: Jan. 31, 2019

(65) Prior Publication Data
US 2021/0237970 A1    Aug. 5, 2021

(30) Foreign Application Priority Data

Jul. 24, 2017 (GB) ..................... 1711854

(51) Int. Cl.
*B65G 1/02* (2006.01)
*A22C 15/00* (2006.01)
(Continued)

(52) U.S. Cl.
CPC .............. *B65G 1/02* (2013.01); *A22C 15/005* (2013.01); *A22C 17/0093* (2013.01);
(Continued)

(58) Field of Classification Search
CPC . B65G 1/00; B65G 35/06; B65G 1/02; B65G 2201/0202; B65G 2207/48;
(Continued)

(56) References Cited

U.S. PATENT DOCUMENTS 3,283,358 A    11/1966  Merriam
3,915,275 A *  10/1975  Specht ................... B65G 39/12
                                                193/35 R
(Continued)

FOREIGN PATENT DOCUMENTS

EP    0509325 A1    10/1992
EP    0474514 A1    11/1992
WO    9936736       7/1999

OTHER PUBLICATIONS

ISR—08 28 2-18.

*Primary Examiner* — James R Bidwell
(74) *Attorney, Agent, or Firm* — Fulwider Patton LLP (57) ABSTRACT

A food product-carrying unit (10) for transferring food product from an in-feed section to an out-feed section of a small-scale, variable retention time (VRT) food storage system comprises a pair of opposing side portions (11, 12) joined by a pair of opposing end portions (13, 14) to form an open rectangular frame section (15). The side portions (11, 12) have formations (16, 17; 18, 19), respectively, thereon, which formations (16, 17; 18, 19) are adapted to reversibly link the food product-carrying unit (10) to corresponding formations on neighbouring food product-carrying units in the food storage system. A wheel (20, 21) is mounted at ends (22, 23), respectively, of end portion (13). Corresponding wheels (24) (only one wheel shown) are mounted at ends (25, 26), respectively, of end portion (14). The and each wheel (20, 21, 24) has an axle with a plastics wear part, and the wheels (20, 21, 24) are aligned such that, in use, the food product-carrying unit (10) is movable forwards and backwards on the wheels (20, 21, 24) in a straight line through the food storage system. The food product-carrying unit (10) also has a wear pad (27, 28; and 29) mounted on the and each end portion (13, 14), respectively, to the outside (31) of the frame section (15).

9 Claims, 9 Drawing Sheets

(51) Int. Cl.
    *A22C 17/00* (2006.01)
    *B65G 35/06* (2006.01)
(52) U.S. Cl.
    CPC ...... *B65G 35/06* (2013.01); *B65G 2201/0202* (2013.01); *B65G 2207/48* (2013.01)
(58) Field of Classification Search
    CPC .. A22C 15/005; A22C 17/0093; B65D 21/02; A22B 7/00; F25D 13/00
    USPC .............................. 198/347.1, 465.2, 465.3
    See application file for complete search history.

(56) References Cited

U.S. PATENT DOCUMENTS

| | | | | |
|---|---|---|---|---|
| 4,256,221 | A * | 3/1981 | Lain | B65G 37/005 |
| | | | | 198/345.3 |
| 4,577,747 | A | 3/1986 | Martin | |
| 5,253,745 | A * | 10/1993 | van den Bergh | B65G 17/08 |
| | | | | 198/465.1 |
| 5,445,485 | A | 8/1995 | Poutet | |
| 5,944,166 | A * | 8/1999 | Bidaud | B65G 17/002 |
| | | | | 198/465.1 |
| 6,367,374 | B1 | 4/2002 | Van Den Bergh et al. | |
| 7,207,436 | B1 * | 4/2007 | Houghton | B65G 15/60 |
| | | | | 198/831 |
| 10,952,533 | B2 * | 3/2021 | Lert, Jr. | A47B 47/0083 |
| 2017/0101264 | A1 | 4/2017 | Brumm et al. | |

* cited by examiner

FOOD STORAGE SYSTEM

CROSS-REFERENCE TO RELATED APPLICATIONS

This application is based upon and claims the benefit of priority from the prior Patent Application No. PCT/EP2018/064107, filed on May 29, 2018, which claims priority from U.K. 1711854.8, filed Jul. 24, 2017, the entire contents of which are incorporated herein by reference.

TECHNICAL FIELD

This invention relates to a food product-carrying unit for use in a food storage system and, in particular, to a food product-carrying unit for transferring the food product from an in-feed section to an out-feed section of a small-scale, variable retention time (VRT) food storage system.

The invention also relates to a small-scale, variable retention time (VRT) food storage system, which utilises a food product-carrying unit as hereinbefore defined.

BACKGROUND ART

VRT food storage systems are used as part of an automated food processing system and typically store food products for varying amounts of time before a packaging stage. The food product can be chilled or frozen while resident in the storage system. The storage system can also act as a buffer as the in-feed of product is decoupled from the out-feed.

European Patent No. 0 474 514 describes conveying and storage systems, which use a product-carrying tray with longitudinally slotted end members for sliding engagement on guide rails in a conveyer installation or storage unit. Transverse edges of the tray are provided with coupling members for inter-engagement with other like trays also accommodated on the guide rails. The tray is especially suited to accommodating food products within a storage or treatment chamber.

The Tray-Link system, manufactured by Power Food Technology of Site E1, Clane Business Park, Clane, Co. Kildare, Ireland, is an example of a large-scale VRT system, which uses the product-carrying tray as described in EP 0 474 514. The system automatically chills and freezes various products simultaneously on a storage rack, while keeping them separated in layers on the rack. Multiple in-feed conveyers feed trays with various products into the system simultaneously. On the out-feed side, multiple conveyers convey automatically transfer trays with the required chilled/frozen products to the various packing stations on demand.

The product-carrying trays are automatically linked together on each layer of the storage rack, which permits any tray to be pushed or pulled from either end of a layer. The system storage capacity can be utilised for production buffering and accumulation. If the out-feed is stopped for any reason, the in-feed continues to accept product. Alternatively, if production is stopped, packing can continue uninterrupted.

The Tray-Link system is computer controlled and is engineered to a high level to ensure a trouble-free working life. However, since the longitudinally slotted end members on the product-carrying trays are suspended on guide rails in a conveyer installation or storage unit, heavy-duty motors are required to push or pull a row of trays through the storage rack. Lubrication of the guide rails is required for smooth running. Thus, the storage rack and trays must be cleaned on a regular basis.

Furthermore, the manufacture and installation of a Tray-Link system is a costly business and would be outside the budget of a small food manufacturing company.

It is an object of the present invention to overcome the disadvantages of the VRT food storage systems hereinbefore described.

DISCLOSURE OF INVENTION

Thus, the invention provides a food product-carrying unit for transferring food product from an in-feed section to an out-feed section of a small-scale, variable retention time (VRT) food storage system, the food product-carrying unit comprising a pair of opposing side portions joined by a pair of opposing end portions to form an open rectangular frame section, the side portions having formations thereon, which formations are adapted to reversibly link the food product-carrying unit to corresponding formations on neighbouring food product-carrying units in the food storage system, a wheel mounted at each end of the end portions, the and each wheel having an axle with a plastics wear part, with the wheels being aligned such that, in use, the food product-carrying unit is movable forwards and backwards on the wheels in a straight line through the food storage system, and a wear pad mounted on the and each end portion to the outside of the frame section.

In the context of the current invention the adjective "small-scale" has the meaning of small in scope. Thus, a small-scale, variable retention time (VRT) food storage system would be used by a small food manufacturing company, who is currently producing product manually.

An advantage of the food product-carrying unit in accordance with the invention is that, as it is mounted on a set wheels, it requires less energy to push or pull it, and any neighbouring units attached thereto, through the food storage system.

A further advantage of the set of wheels is that no lubrication is required between the unit and the storage system and therefore the cost of cleaning the storage system is reduced as compared to the prior-art system which uses lubricated rails on which the product-carrying units are suspended and along which the units are pushed and pulled.

A further advantage of the food product-carrying unit in accordance with the invention is that the combination of the set of wheels, with the and each wheel having an axle with plastics wear part, together with the plastics wear pads on the outside of the frame section, means that metal-on-metal contact is eliminated when moving the units in the storage system. This eliminates the danger of metal shaving contamination of the food product in the storage system.

Preferably, a support member is located within the frame section and is attached thereto, which support member is adapted to receive an insert thereon.

An advantage of the addition of the member to the frame section is that it provides a firm support for the insert.

A further advantage of the frame section and support member combination is that it can accommodate a variety of inserts.

In one embodiment in accordance with the invention, the insert is a drip tray.

An advantage of a drip tray insert is that any food waste, such as juices from a meat product, will be retained in the drip tray, and the drip tray can be cleaned between uses of the food product-carrying unit.

Preferably, a rack for hanging food product above the drip tray is mounted on the frame section.

An advantage of the addition of a rack is that food product can be stored, without it resting on the food product-carrying unit.

Further, preferably, the food product is a pork belly, with the and each pork belly, in use, being laid horizontally on the drip tray or being hung by a hook from the rack.

An advantage of the food product-carrying unit in which the product can be stored both horizontally and then vertically is that it mimics the manual method of storing the pork bellies prior to slicing and packaging. In this method smoked pork bellies are laid horizontally for a day or so and are then hung for another day, before slicing and packaging.

Further, preferably, one or more retaining arms are mounted on the opposing side portions and are upstanding therefrom.

An advantage of the retaining arms is that the pork bellies, when laid horizontally on the drip tray will be retained on the tray, particularly when the food product-carrying unit is being moved within the food storage system In a further embodiment in accordance with the invention, the insert is a steel mesh grating.

An advantage of a steel mesh grating insert is that air is free to circulate through the grate and around any food product supported thereon. Efficient air circulation is important where a product is being cooled or heated while being stored.

In a further embodiment in accordance with the invention, the insert is a moulded plastics tray having depressions therein for receipt of individual product units.

An advantage of a moulded plastics tray having depressions therein is that the individual product units will be held in the insert in a stable manner.

Preferably, the individual product units are tubs of ice-cream or the like.

An advantage of holding tubs of ice-cream within depressions in the plastics tray is that it reduces the danger of any tubs falling off the food product-carrying unit.

In another aspect of the invention, there is provided a small-scale, variable retention time (VRT) food storage system, comprising a modular storage rack having a three-dimensional, lattice structure defining a plurality of bays, the and each bay being separated into a plurality of levels, a rail mounted to each side of the and each bay, at each level therein, such that, in use, one or more food product-carrying units are receivable, at an in-feed section to one side of the modular storage rack, onto the rails on a level within a bay, for storage therein.

An advantage of the small-scale, variable retention time (VRT) food storage system in accordance with the invention is that, because of its modular form, the capacity thereof can be increased as the business, employing it, expands.

A further advantage of the storage system according to the invention is that the food product-carrying units sit on the rails in the bays and travel along the rails on the set of wheels, thus, eliminating the requirement for lubrication between the rails and the food product-carrying units.

Preferably, the one or more product-carrying units are removable from an out-feed section on the opposite side of the modular storage rack.

An advantage of having the in-feed section and the out-feed section at opposite sides of the modular storage rack is that food product-carrying units can be added and removed from the rack in an efficient manner.

In a further embodiment in accordance with the invention, the in-feed section and an out-feed section are on the same side of the modular storage rack, such that the and each product-carrying unit is receivable in and removable from the same side of the modular storage rack.

An advantage of this arrangement is that food product-carrying units can be added and removed from the rack by the same handling machinery.

Preferably, a crane is adapted to introduce the and each food product-carrying unit to an in-feed section and to remove the and each food product-carrying unit from the modular storage rack.

An advantage of this arrangement is that the initial cost of the system will be reduced and ongoing maintenance costs.

BRIEF DESCRIPTION OF DRAWINGS

The invention will be further illustrated by the following description of embodiments thereof, given by way of example only with reference to the accompanying drawings in which.

MODES FOR CARRYING OUT THE INVENTION

Figure 1:
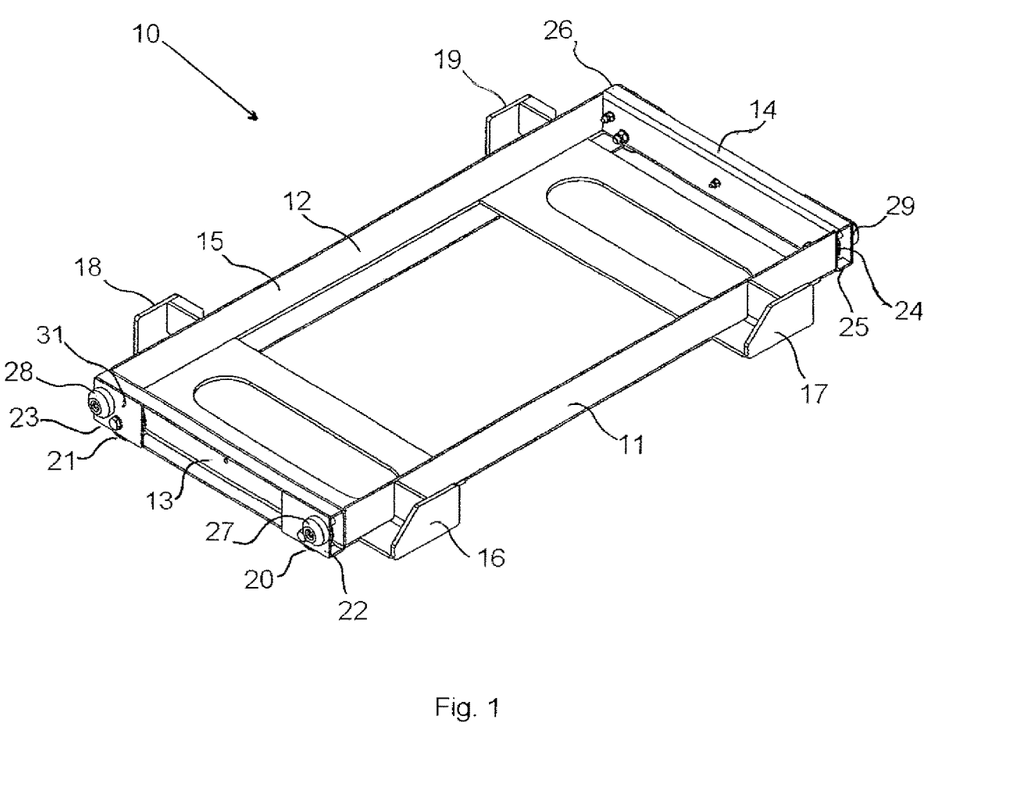
FIG. 1 is a perspective view from above and to one side of a food product-carrying unit for transferring food product from an in-feed section to an out-feed section of a small-scale, variable retention time (VRT) food storage system in accordance with the invention.

Referring to FIG. 1, there is illustrated generally at 10, a food product-carrying unit for transferring food product from an in-feed section to an out-feed section of a small-scale, variable retention time (VRT) food storage system in accordance with the invention. The food product-carrying unit 10 comprises a pair of opposing side portions 11, 12 joined by a pair of opposing end portions 13, 14 to form an open rectangular frame section 15. The side portions 11, 12 have formations 16, 17; 18, 19, respectively, thereon, which formations 16, 17; 18, 19 are adapted to reversibly link the food product-carrying unit 10 to corresponding formations on neighbouring food product-carrying units (not shown) in the food storage system. A wheel 20, 21 is mounted at ends 22, 23, respectively, of end portion 13. Corresponding wheels 24 (only one wheel shown) are mounted at ends 25, 26, respectively, of end portion 14. The and each wheel 20, 21, 24 has an axle (not shown) with a plastics wear part (not shown), and the wheels 20, 21, 24 are aligned such that, in use, the food product-carrying unit 10 is movable forwards and backwards on the wheels 20, 21, 24 in a straight line through the food storage system. The food product-carrying unit 10 also has a wear pad 27, 28; 29 and 30 (see FIG. 2) mounted on the and each end portion 13, 14, respectively, to outside 31 of the frame section 15.

Figure 2:
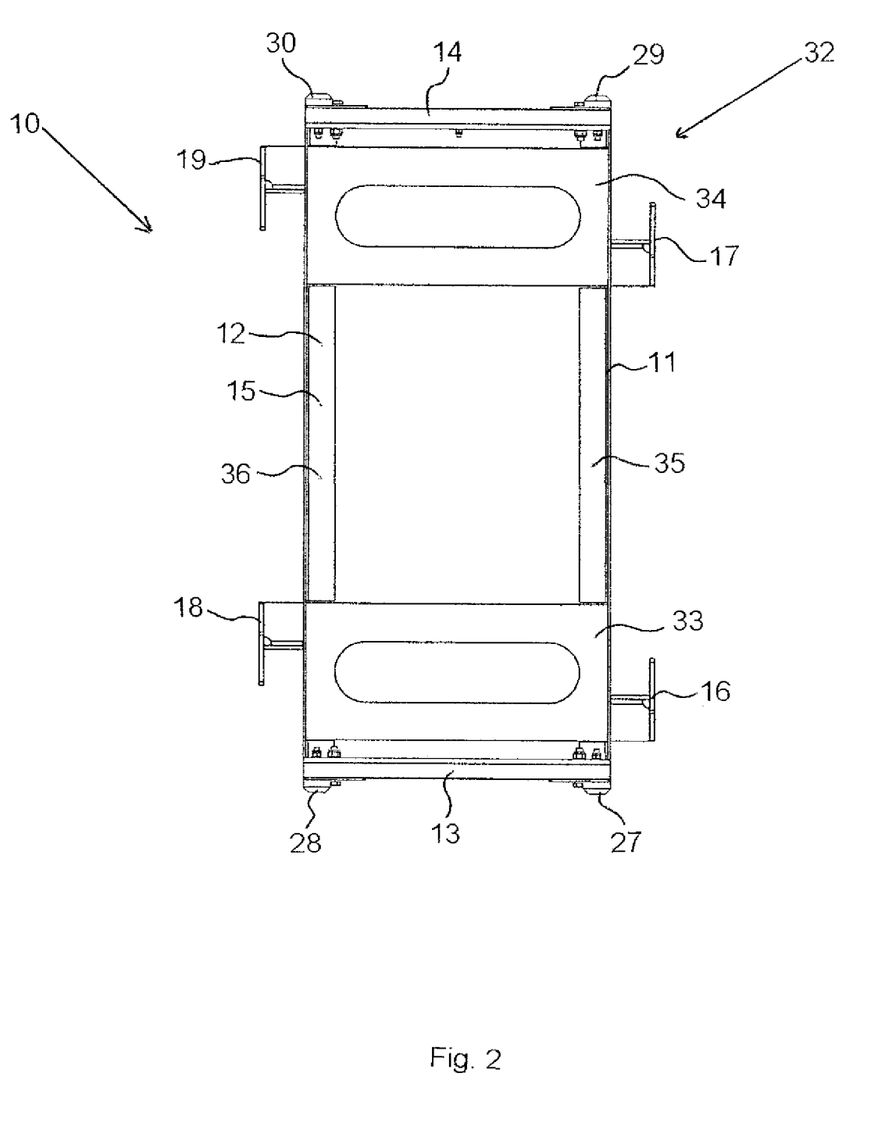
FIG. 2 is a plan view of the food product-carrying unit of FIG. 1.

Referring to FIG. 2, the food product-carrying unit 10 is shown in a plan view. A member, shown generally at 32, consists of two slotted shelves 33, 34, located within the frame section 15, and abutting respective end portions 13, 14. The member 32 also includes two ledges 35, 36, which bridge the gap between the slotted shelves 33, 34, with the member 32 being adapted to receive an insert thereon. Wear pads 27, 28, 29, 30 are all visible in FIG. 2.

The formations 16, 17 on the side portion 11 are offset relative to the formations 18, 19 on the side portion 12. This offsetting facilitates the coupling of the food product-carrying units 10 together.

Figure 3:
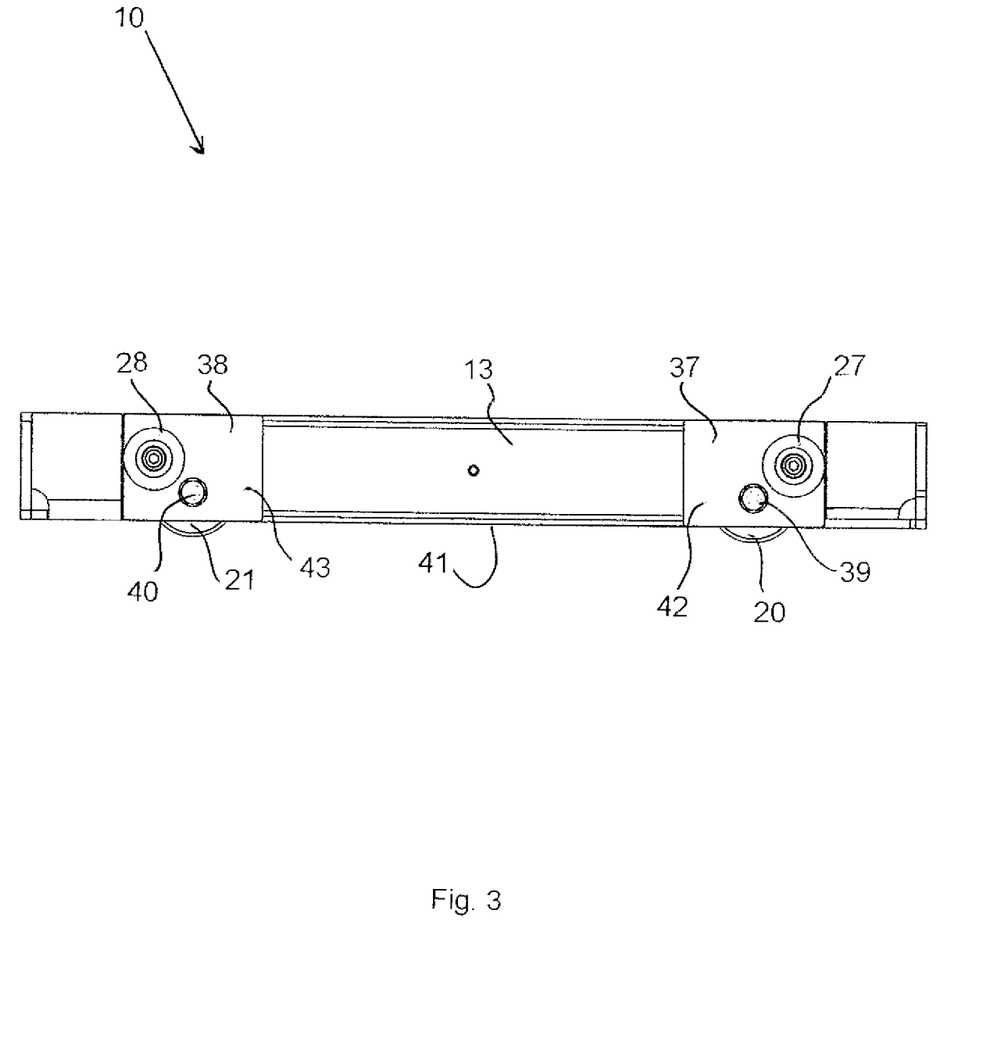
FIG. 3 is an end elevation view of the food product-carrying unit of FIG. 1.

Referring to FIG. 3, an end elevation of the food product-carrying unit 10 is shown. The wheels 20, 21 are mounted on the end portion 13 in wheel housings 37, 38 respectively. The wheels 20, 21 are mounted for rotation on axles 39, 40, respectively, and the wheels 20, 21 extend below lower surface 41 of the food product-carrying unit 10. The wear pads 27, 28 are mounted on outside surfaces 42, 43, respectively, of wheel housings 37, 38.

Figure 4:
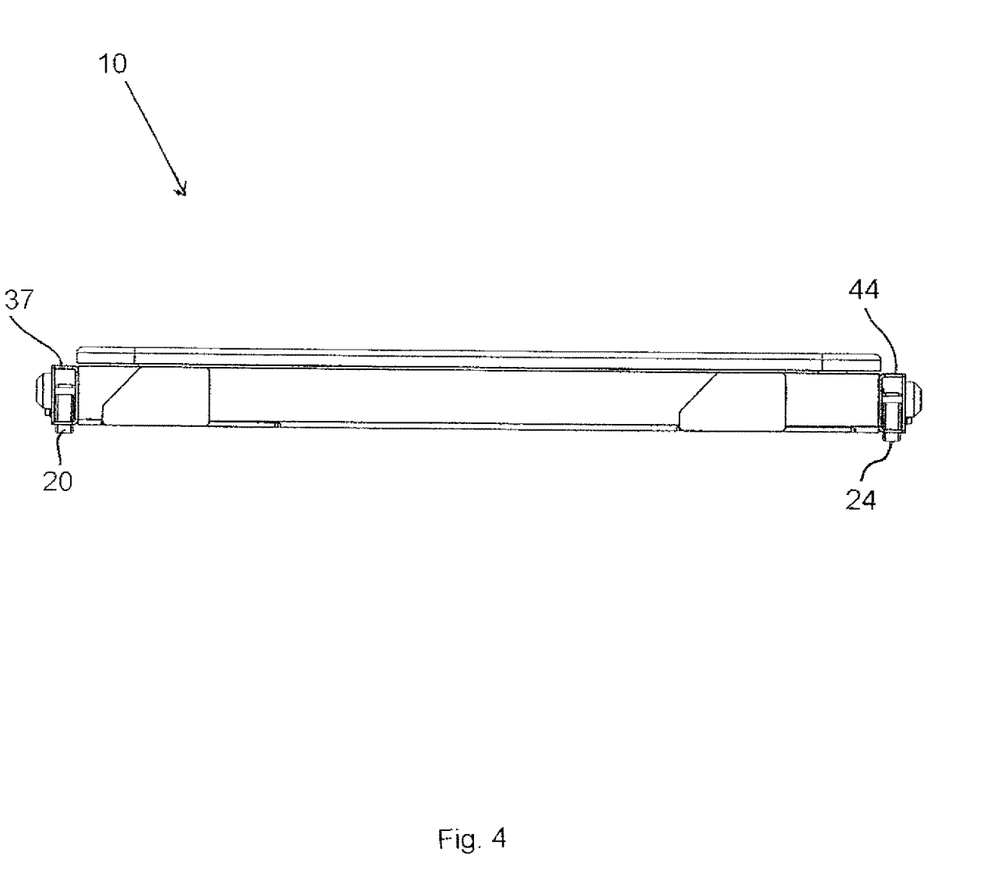
FIG. 4 is a side elevation of the food product-carrying unit of FIG. 1.

Referring to FIG. 4, a side elevation of the food product-carrying unit 10 is shown. The wheel 20 is mounted within the wheel housing 37 and the wheel 24 is mounted in a wheel housing 44.

Figure 5:
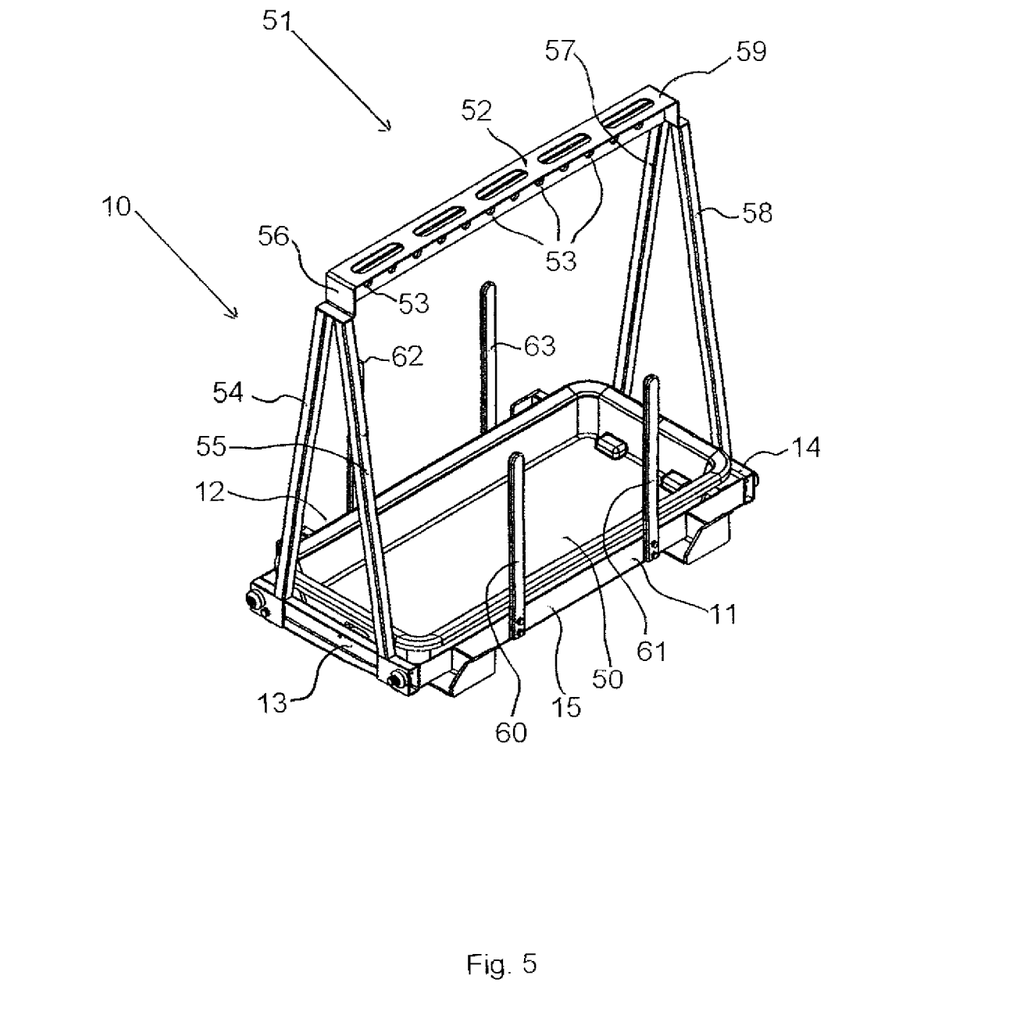
FIG. 5 is a perspective view from above and to one side of a second embodiment of the food product-carrying unit for transferring food product from an in-feed section to an out-feed section of a small-scale, variable retention time (VRT) food storage system in accordance with the invention.

Referring to FIG. 5, a second embodiment of the food product-carrying unit 10 is shown in perspective. The food product-carrying unit 10 of FIG. 1 has been modified by the addition of an insert in the form of a drip tray 50, which drip tray 50 is located within the frame section 15.

A rack for hanging food product above the drip tray 50, shown generally at 51, is mounted on the frame section 15. The rack 51 consists of a folded plate section 52 defining a plurality of holes 53 therein, in which, in use, hooks for hanging food product food product are locatable. Tubular box section supports 54, 55 are mounted on the end portion 13 and support end 56 of the folded plate section 52 above the drip tray 50. Similar box section supports 57, 58 are mounted on the end portion 14 and support end 59 of the folded plate section 52 above the drip tray 50.

A pair of retaining arms 60, 61 is mounted on the side portion 11 and a corresponding pair of retaining arms 62, 63 is mounted on the side portion 12.

In use pork bellies are laid horizontally on the drip tray for part of their stay in the storage system and are hung from the folded plate section 52 for the remainder of their stay in the storage system.

Figure 6:
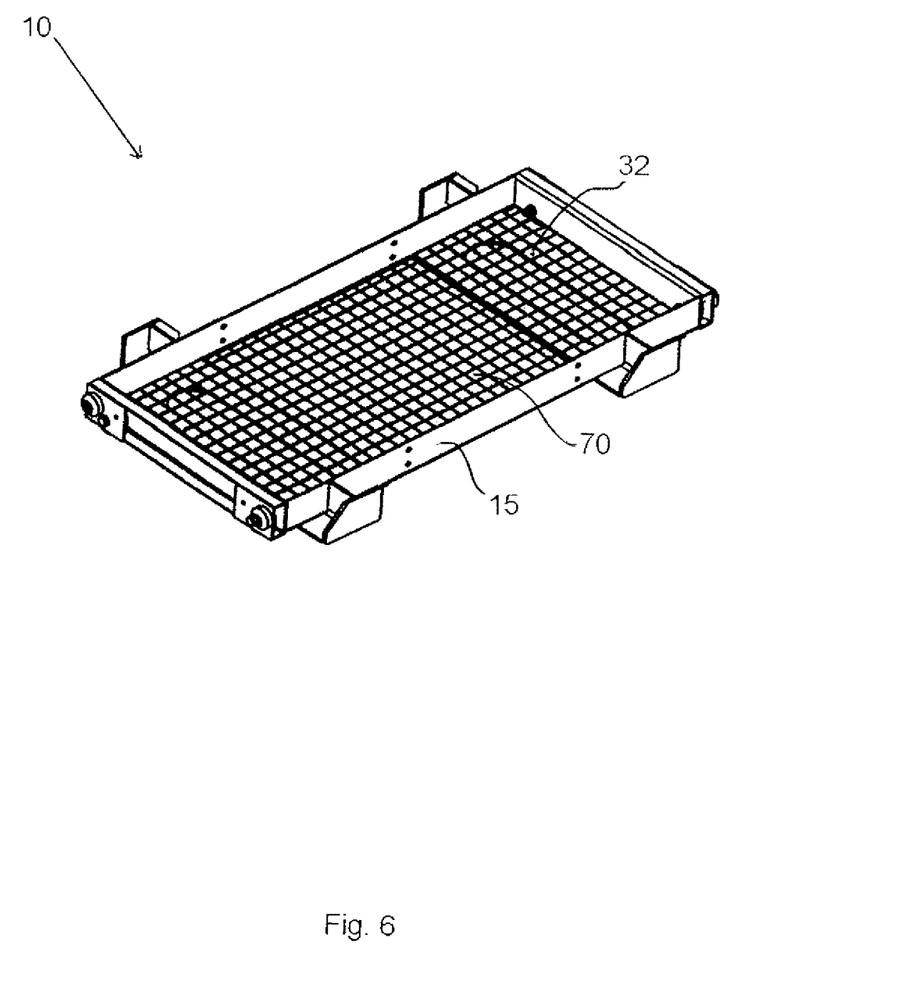
FIG. 6 is a perspective view from above and to one side of a third embodiment of the food product-carrying unit for transferring food product from an in-feed section to an out-feed section of a small-scale, variable retention time (VRT) food storage system in accordance with the invention.

Referring to FIG. 6, a third embodiment of the food product-carrying unit 10 is shown in perspective. The food product-carrying unit 10 of FIG. 1 has been modified by the addition of an insert in the form of a steel mesh grating 70, which grating 70 is located within the frame section 15 and rests on the member 32. In use, the steel mesh grating 70 facilitates the flow of air around any product supported thereon.

Figure 7:
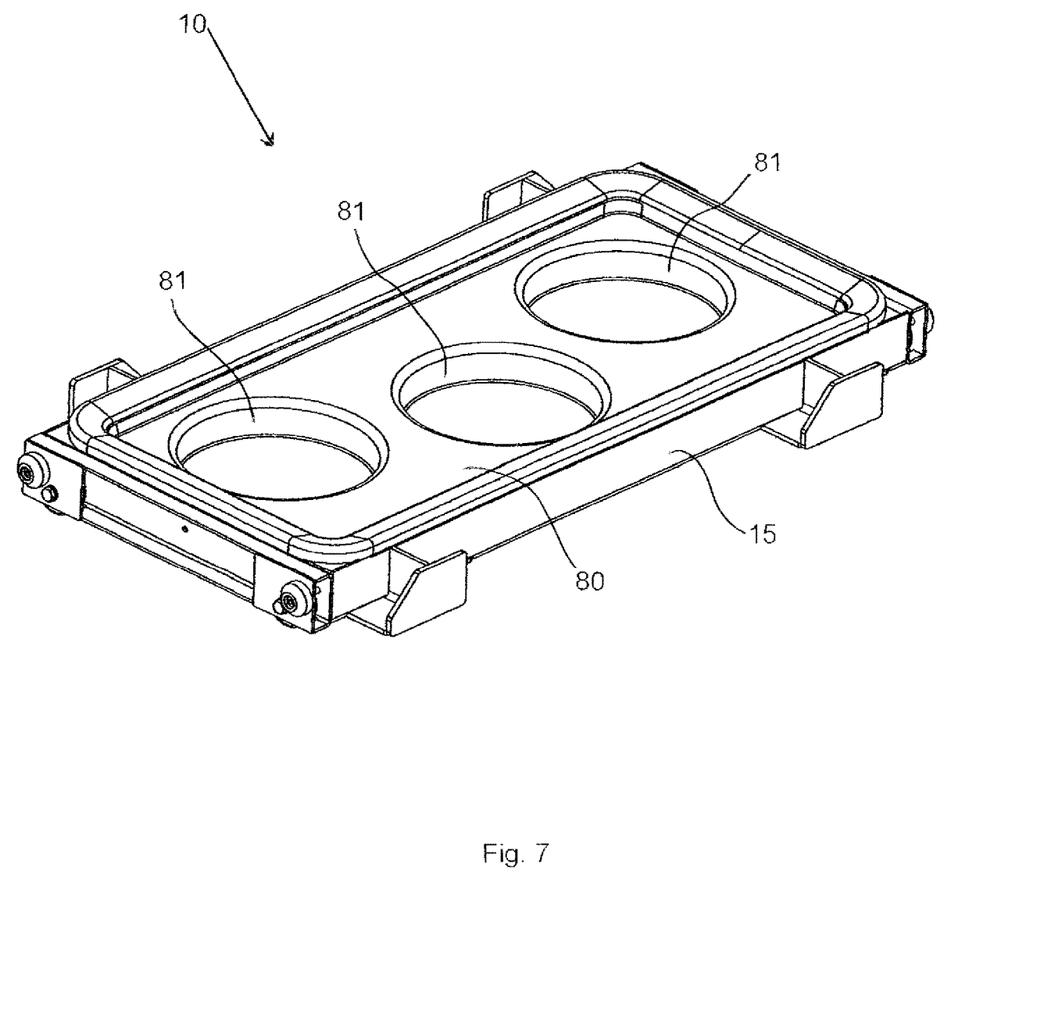
FIG. 7 is a perspective view from above and to one side of a fourth embodiment of the food product-carrying unit for transferring food product from an in-feed section to an out-feed section of a small-scale, variable retention time (VRT) food storage system in accordance with the invention.

Referring to FIG. 7, a fourth embodiment of the food product-carrying unit 10 is shown in perspective. The food product-carrying unit 10 of FIG. 1 has been modified by the addition of an insert in the form of a moulded plastics tray 80, which moulded plastics tray 80 is located within the frame section 15 and rests on the member 32 (not shown). Three depressions 81, for receipt of individual product units, such as ice-cream tubs, are formed in the moulded plastics tray 80.

Figure 8:
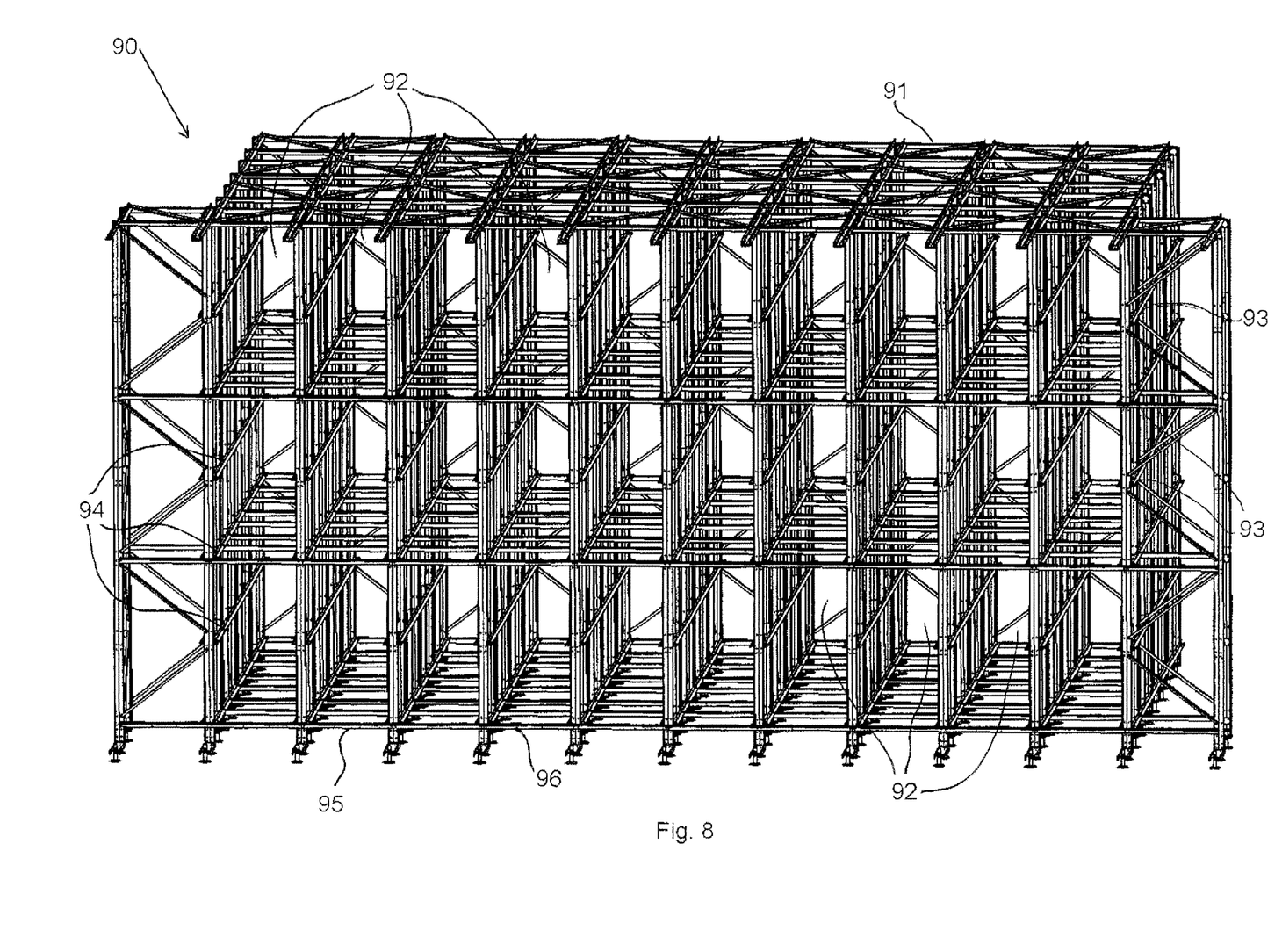
FIG. 8 is a perspective view from above and to one side of a small-scale, variable retention time (VRT) food storage system in accordance with the invention.

Referring to FIG. 8, there is illustrated generally at 90, a small-scale, variable retention time (VRT) food storage system in accordance with the invention. The storage system 90 comprises a modular storage rack 91 having a three-dimensional, lattice structure defining a plurality of bays 92, the and each bay 92 being separated into a plurality of levels 93. A rail 94 mounted to each side of the and each bay 92, at each level 93 therein, such that, in use, one or more food product-carrying units (not shown) in accordance with the invention, are receivable, at an in-feed section 95 to one side 96 of the modular storage rack 91, onto the rails 94 on a level 93 within a bay 92, for storage therein.

Figure 9:
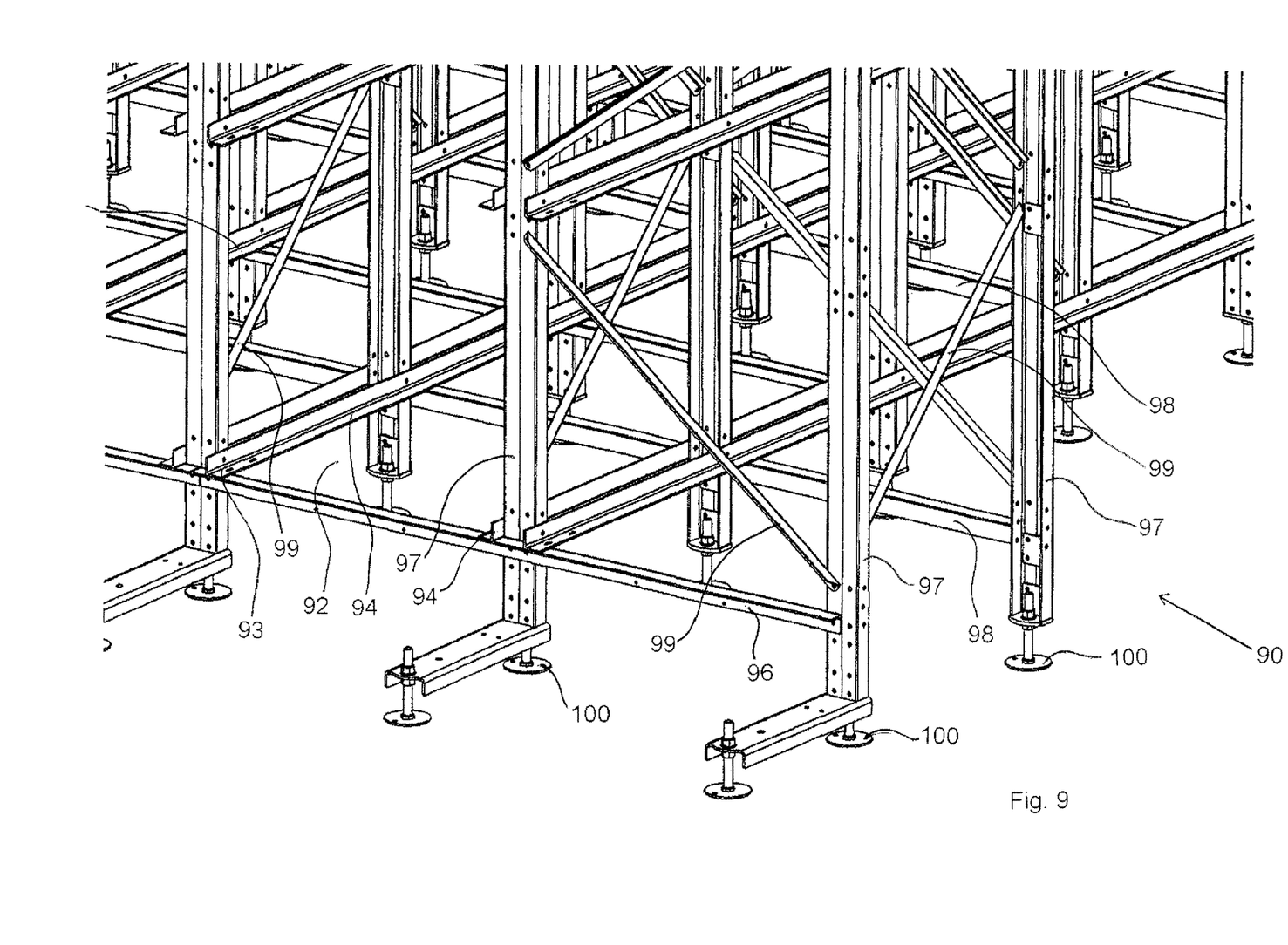
FIG. 9 is a detailed view of a section of food storage system of FIG. 8.

Referring to FIG. 9, a detailed view of a section of the food storage system of FIG. 8 is illustrated. The modular storage rack 91 has a lattice structure defined by vertical supports 97 and horizontal supports 98 and diagonal bracing supports 99. Each vertical support 97 is mounted on an adjustable foot 100 for levelling the modular storage rack 91.

A rail 94 is mounted to each side of each level 93 within a bay 92. The rails 94 run from the side 96 of the modular storage rack 91 to the opposite side (not shown). In use, one or more food product-carrying units are receivable on the rails 94 and can be pushed or pulled through the bay 92, as required.

The invention claimed is:

1. A food product-carrying unit for transferring food product from an in-feed section to an out-feed section of a small-scale, variable retention time (VRT) food storage system, the food product-carrying unit comprising a pair of opposing side portions joined by a pair of opposing end portions to form an open rectangular frame section, said frame section having a member located therein that is adapted to receive a drip tray, the side portions having formations thereon, which formations are adapted to reversibly link the food product-carrying unit to corresponding formations on neighbouring food product-carrying units in the food storage system, a wheel mounted at each end of the end portions, the and each wheel having an axle with a plastics wear part, with the wheels being aligned such that, in use, the food product-carrying unit is movable forwards and backwards on the wheels in a straight line through the food storage system, a wear pad mounted on the and each end portion to the outside of the frame section; and a rack for hanging food product above the drip tray and mounted on the frame section.

2. A food product-carrying unit according to claim 1, wherein the food product is a pork belly, with each pork belly, in use, being laid horizontally on the drip tray or being hung by a hook from the rack.

3. A food product-carrying unit according to claim 2, wherein one or more retaining arms are mounted on the opposing side portions and are upstanding therefrom.

4. A food product-carrying unit according to claim 1, wherein the drip tray is a steel mesh grating.

5. A food product-carrying unit according to claim 1, wherein the drip tray is a moulded plastics tray having depressions therein for receipt of individual product units.

6. A food product-carrying unit according to claim 5, wherein the individual product units are tubs of ice-cream.

7. A small-scale, variable retention time (VRT) food storage system, comprising a modular storage rack having a three-dimensional, lattice structure defining a plurality of bays, the and each bay being separated into a plurality of levels, a rail mounted to each side of the and each bay, at each level therein, such that, in use, one or more food product-carrying units, each comprising:

a pair of opposing side portions joined by a pair of opposing end portions to form an open rectangular frame section said frame section having a member located therein that is adapted to receive a drip tray, the side portions having formations thereon, which formations are adapted to reversibly link the food product-carrying unit to corresponding formations on neighboring food product-carrying units in the food storage system, a wheel mounted at each end of the end portions, the and each wheel having an axle with a plastics wear part, with the wheels being aligned such that, in use, the food product-carrying unit is movable forwards and backwards on the wheels in a straight line through the food storage system, and a wear pad mounted on the and each end portion to the outside of the frame section;

said food product carrying units being receivable at an in-feed section to one side of the modular storage rack, onto the rails on a level within a bay, for storage therein; and a rack for hanging food product above the drip tray and mounted on the frame section.

8. A food storage system according to claim 7, wherein the one or more product-carrying units are removable from an out-feed section on the opposite side of the modular storage rack.

9. A food storage system according to claim 7, wherein the in-feed section and an out-feed section are on the same side of the modular storage rack, such that each product-carrying unit is receivable in and removable from the same side of the modular storage rack.

\* \* \* \* \*